United States Patent [19]

Simjian

[11] 4,249,071

[45] Feb. 3, 1981

[54] METERING SYSTEM

[76] Inventor: Luther G. Simjian, Lago Mar Pl., 1750 S. Ocean La., Fort Lauderdale, Fla. 33316

[21] Appl. No.: 15,588

[22] Filed: Feb. 27, 1979

[51] Int. Cl.[3] ........................ G06F 15/20; G06F 15/30; G06K 19/06; D06F 39/00

[52] U.S. Cl. .................................... 235/375; 235/379; 235/494; 364/900; 70/304

[58] Field of Search ............... 235/375, 379, 380, 381, 235/382, 384, 494; 70/304; 250/569; 340/147 R, 149 A, 152 R; 364/900

[56] References Cited

U.S. PATENT DOCUMENTS

| | | | |
|---|---|---|---|
| 3,588,449 | 6/1971 | Paterson | 235/379 |
| 3,641,315 | 2/1972 | Nagata | 235/379 |
| 3,664,231 | 5/1972 | Hanson | 70/304 |
| 3,665,162 | 5/1972 | Yamamoto | 340/149 A |
| 3,740,530 | 6/1973 | Hoffer | 340/149 A |
| 3,792,446 | 2/1974 | McFiggins | 364/900 |
| 3,824,544 | 7/1974 | Simjian | 340/147 A |
| 4,114,140 | 9/1978 | Kubina | 340/149 A |

*Primary Examiner*—Robert M. Kilgore

[57] ABSTRACT

A metering device, such as a postage meter, can be updated by a code bearing means which is provided with a first discernible code and a second obscured code, for instance, magnetic code. A computer stores a third code in association with the first code, however, the third code is correlated with the second code. Upon obtaining the third code from the computer and providing the third code on the code bearing means, the code bearing means is inserted in the metering device for causing the metering device to be conditioned for updating responsive to said second code and said third code on said code bearing means being in predetermined correlation.

10 Claims, 4 Drawing Figures

METERING SYSTEM

BACKGROUND OF THE INVENTION

This invention concerns metering systems in which a meter upon being updated is conditioned for dispensing a predetermined sum or quantity of articles or is conditioned for dispensing postage stamps or imprinting validation stamps up to a predetermined sum of money. A typical specific example of such metering systems is the well known postage meter which from time to time needs to be recharged with a sum of money in order to dispense validation of variable amounts of money. When the supply of money or credit available is exhausted, the meter is blocked from further operation. The meter can be charged with a new sum of money prior to reaching its fully exhausted condition and, thus, remains operable while a sum of money, or credit, is available. Meters of the type described above are well known and some of the arrangements for meters include means for charging the meter without physically bringing the meter to the Post Office. The latter arrangements are shown, for example, in my U.S. Pat. No. 3,255,439 "Postage Metering System" dated June 7, 1966; No. 3,428,948 "Postage Metering System" dated Feb. 18, 1969; No. 3,501,744 "Postage Metering System Having Signal Conditioning Means" dated Mar. 17, 1970, and in the patent to McFiggins et al No. 3,792,446 "Remote Postage Meter Resetting Method" dated Feb. 12, 1974. Other pertinent art referring to the meter itself using combination locks or requiring predetermined numbers for recharging the meter will be found in U.S. Pat. No. 3,034,329 "Combination Lock Device" dated May 15, 1962 and No. 3,664,231 "Locking Device" dated May 23, 1972.

With respect to U.S. Pat. No. 3,664,231 and No. 3,792,446, the meter includes a storage tape having numbers to be used in predetermined sequence, the tape being stored in the meter and the user of the meter who is a subscriber to the service, is informed of a currently applicable number which correlates with the respective number on the tape. Responsive to the existence of correlation between the number set on the lock and the current number on the storage tape, the meter can be updated or recharged and the next successive number on the tape becomes applicable to the following recharging operation. The user is advised of the next number to be used for charging the meter.

The present invention omits the need for a storage tape in the meter and employs instead uniquely coded code bearing means in combination with a computer for updating the meter.

Other significant differences and advantages of the present invention over the prior art will be more clearly apparent from the description hereinafter.

SUMMARY OF THE INVENTION

In accordance with the present invention there is provided a code bearing means having a first code and a second code, and the metering device, such as a postage meter, is adapted to receive the code bearing means. A remote computing means includes a storage means for storing said first code and correlating such first code with a third code. Input means are adapted to provide said first code to said computing means whereupon said computing means provides said third code. This third code is then provided upon said code bearing means. When said code bearing means is brought into operative relationship with the metering device, sensing means determine whether said second code and said third code are in predetermined correlation and responsive to the existence of correlation causing said metering device to be conditioned for updating. Additional means render the same combination of codes unusable responsive to conditioning of said metering device having occurred.

DETAILED DESCRIPTION OF THE INVENTION

Figure 1:
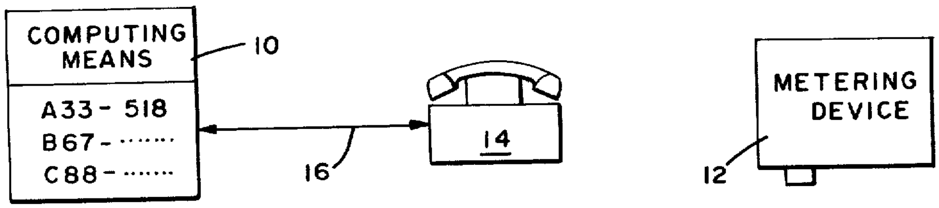
FIG. 1 is a schematic block diagram of the metering system forming the invention.

Referring now to the figures and FIG. 1 in particular, numeral 10 identifies a computing means which is located remote from a metering device 12, such as a postage meter or similar device. Also remote from the computing means 10 there is a transmitting means 14 which is connected to the computing means 10 by a suitable electrical transmitting line 16, for instance, a cable or a wireless connection. Most suitably, the transmitting means is a telephone with signal input means such as audio signals or electrical push buttons (push button telephone) which in response to an output from the computing means 10 provides the data provided by the computing means 10 in audio or visual form as is well known, for instance, in connection with stock market quotations, see U.S. Pat. No. 3,082,402 to J. R. Scantlin. The telephone 14 may be in proximity to the metering device 12, but it may also be remote from the metering device.

Figure 2:
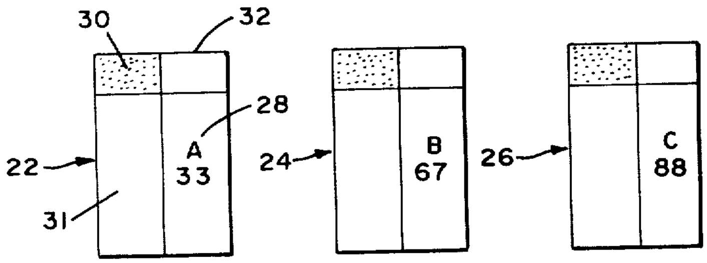
FIG. 2 is a schematic illustration of several code bearing means.

The metering device 12 is recharged or updated by the use of a code bearing means of the type illustrated in FIG. 2. In FIG. 2 three illustrative code bearing means 22, 24 and 26 are shown. Each code bearing means, typically a plastic card similar to a credit card, is provided with a first code 28 which is discernible to a person and for this reason such code may comprise printed characters "A33" as evident on the code bearing member 22. On members 24 and 26 the first code typically is "B67" and "C88" respectively.

Each code bearing member includes a second code which is obscured and therefore not readily discernible to the user of the system. To this end the second code may comprise magnetic characters disposed in a field 30. For the present example it is assumed that the second code of the code bearing member 22 in field 30 comprises a three digit number "481". The corresponding second codes on the members 24 and 26 are distinct for each such member. Each code bearing means includes a further field 31 which is to be completed by the person responsible for updating the metering device by inserting into this field a code which is obtained from the computing means as will be described hereinafter.

Optionally, each member 22, 24 and 26 may include a still further code in field 32 which associates such code bearing member with a particular metering device 12 and, therefore, such further code may be considered a validation code which validates the use of a particular code bearing member with a respective predetermined metering device.

The computing means 10 has stored therein the first codes of the code bearing members which have been issued to a subscriber using the metering device 12. Thus, the computing means has stored therein the data "A33", "B67" and "C88" indicated on the code bearing members 22, 24 and 26 which are in the hands of the subscriber. Associated with each first code data, the computing means also stores a plurality of third codes, each such third code data being correlated with the second code on the respective code bearing means. To clearly illustrate this correlation, it was assumed that member 22 has a first code "A33" and a second non-discernible code "481". The computing means 10 stores associated with "A33" a third code "518", the latter code being the nine complement numerals. Other correlations, of course, can be selected at the option of the designer of the system and the specific type of correlation is not pertinent to the invention.

Figure 3:
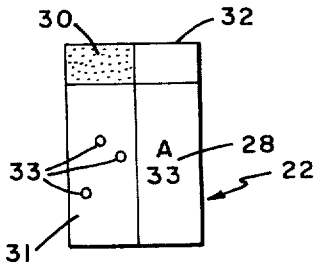
FIG. 3 is a schematic illustration of a code bearing means just prior to insertion into the metering device.

Operation of the foregoing arrangement will be more clearly evident from the following description. In order to update the metering device 12, the subscriber takes a code bearing member, such as member 22, and by means of the telephone 14 communicates the first code "A33" visible on the code bearing means 22 to the computer means 10. The computing means is programmed to search for the designation "A33" and upon finding "A33" communicates the preprogrammed associated third code designation "518" via the communication link 16 to the telephone 14 for receipt by the person responsible for updating the metering device. The data may be received in aural or visual form as is known to those skilled in the art. Upon receipt of the data the person now is required to provide the code designation "518" (third code) received from the computing means in the field 31. To this end the field or predetermined area may be precoded with printed numerals and spaces which must be marked with a pencil, such as the "mark-sensing" known from tabulating cards or, alternatively, must be punched as shown in FIG. 3. As illustrated in FIG. 3, the field 31 has been punched with three holes 33, the positions of which correspond to the third code designation "518" obtained from the computing means.

Figure 4:
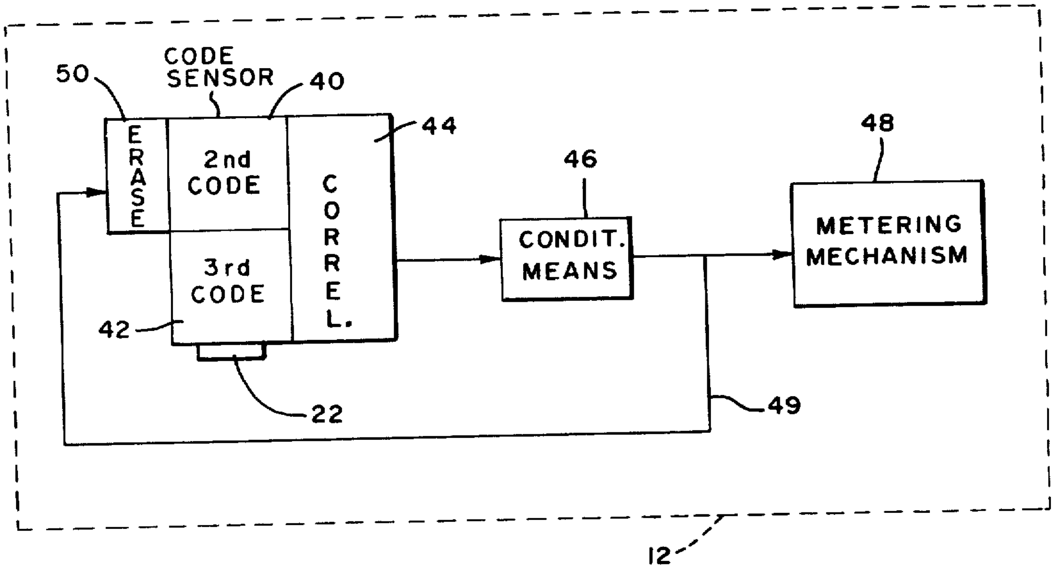
FIG. 4 is a schematic block diagram of portions forming the metering device.

The operator now inserts the code bearing means 22 in the control section of the metering device, see FIG. 4. The control section includes two code sensing means 40 and 42, the code sensing means 40 for sensing the second code in field 30 and the code sensing means 42 for sensing the third code supplied to field 31 as described above. It was assumed that the second code in field 30 read "481" and that the computing means 10 was programmed to supply the third code "518" which was associated with code bearing means 22. It will be noted that numeral "518" is the nine-complement of "481", the predetermined correlation. The existence of this correlation is sensed by the correlator 44 which sends a suitable signal to the metering conditioning means 46 for permitting the metering mechanism 48 to be changed or updated. The conditioning means 46 may comprise means for temporarily coupling shafts within the meter mechanism to one another, see U.S. Pat. No. 3,501,744. Responsive to the actuation of the conditioning mechanism 46 a signal is fed via conductor 49 to an erase means 50 which erases the code from the field 30 of the code bearing means to render the code bearing member invalid for further use. Alternatively, other cancellation means or voiding means may be used, such as mutilating means (heating, cutting) effective upon fields 30, 31 or 32.

Assuming that the predetermined condition of correlation is not attained, the conditioning means 46 remains non-actuated and the metering mechanism 48 cannot be updated.

Alternatively instead of erasing or voiding the second code on the code bearing member, erasing means associated with the computing means may be provided to erase, responsive to providing the third code, either the first code, the third code or both codes from the storage medium provided in the computing means, the principal object being to foil for the immediate future correlation between the first, second and third code data used in a preceding updating operation.

For the sake of simplicity, the sensing means for the code in field 32 has not been shown. As previously explained, this code serves as an additional safeguard associating a code bearing means with a specific metering device. Such keying is well known and requires no specific explanation.

In the foregoing system, the subscriber is provided with code bearing means for which a corresponding charge is made or, alternatively, the subscriber is invoiced responsive to updating operations as recorded by the computing means and evident by the issuance of third code data.

It will be apparent, moreover, that the second code and third code data need not to be different but may be identical, and the existence of a predetermined correlation is determined by the correlator 44.

The code information obtained from the computing means 10 and required to be inserted into the specified area delineated by field 31 of the code bearing means, member 22, may be inserted thereinto by a manually held instrument or by utilizing a suitable signal responsive instrumentality, such as a multipunch, a magnetic encoder, etc.

The above description deals specifically with a postage metering device. It should be understood that the described arrangement is not limited to dispensing postage, but that the metering device will be found usable also for purposes other than that specifically illustrated and described.

While I have described and illustrated certain preferred embodiments of my invention, it will be apparent to those skilled in the art that various further changes and modifications may be made without departing from the broad principle of my invention which shall be limited only by the scope of the appended claims.

What is claimed is:

1. The method of updating a metering device of the postage meter type or similar type comprising:

providing a code bearing means having a first and a second code;

transmitting the first code from said code bearing means to a computing means and said computing means being programmed for providing in response to the receipt of said first code a third code which has a predetermined correlation with said second code;

entering said third code on said code bearing means, and providing cooperative relation between said code bearing means and said metering device for causing said metering device to be in condition for being updated responsive to said second code and said third code being in said predetermined correlation.

2. The method as set forth in claim 1, said first code being a visible code.

3. The method as set forth in claim 1, said second code being obscured.

4. The method as set forth in claim 1, said first code being transmitted and said computing means providing said third code by signal transmitting means.

5. The method as set forth in claim 1, and causing the code bearing means to be rendered entirely or partially unuseable for reuse responsive to said metering device having been updated.

6. The method as set forth in claim 1, said third code being entered on said code bearing means in a predetermined area thereof.

7. The method as set forth in claim 6, said third code being entered in said predetermined area by marking predetermined spaces correlated with said third code.

8. The method as set forth in claim 6, said third code being entered in said predetermined area by perforating predetermined spaces correlated with said third code.

9. The method of updating a metering device of the postage meter type or similar type comprising:

providing a code bearing means having a first code and a second code;

entering on said code bearing means a third code which has a predetermined relation with said second code, and providing cooperative relation between said code bearing means and said metering device for causing said metering device to be in condition for being updated responsive to said second code and said third code being in predetermined correlation.

10. The method of updating as set forth in claim 9, said third code and said first code also being correlated.

* * * * *